US008355565B1

(12) United States Patent
Yang et al.

(10) Patent No.: US 8,355,565 B1
(45) Date of Patent: Jan. 15, 2013

(54) PRODUCING HIGH QUALITY DEPTH MAPS

(75) Inventors: Qingxiong Yang, Urbana, IL (US); Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 12/608,394

(22) Filed: Oct. 29, 2009

(51) Int. Cl.
G06K 9/00 (2006.01)
(52) U.S. Cl. ......................................... 382/154; 382/216
(58) Field of Classification Search .................. 382/154, 382/216
See application file for complete search history.

(56) References Cited

U.S. PATENT DOCUMENTS

| 7,657,080 B2 * | 2/2010 | Allman et al. ............... 382/154 |
| 2003/0091225 A1 * | 5/2003 | Chen ............................ 382/145 |
| 2003/0132950 A1 * | 7/2003 | Surucu et al. ............... 345/700 |
| 2012/0039525 A1 * | 2/2012 | Tian et al. .................... 382/154 |

OTHER PUBLICATIONS

Yang, Qingxiong et al., "Spatial-Depth Super Resolution for Range Images", *IEEE Computer Society Conference on Computer Vision and Pattern Recognition (CVPR)*, (2007),1-8.

Kopf, Johannes et al., "Joint Bilateral Upsampling" *ACM Transactions on Graphics. Proceedings of SIGGRAPH* 2007 vol. 26 No. 3, (2007).

Zhu, Jiejie et al., "Fusion of Time-of-Flight Depth and Stereo for High Accuracy Depth Maps" *IEEE Computer Society Conference on Computer Vision and Pattern Recognition (CVPR)*, (Jun. 23-28, 2008),1-8.

* cited by examiner

*Primary Examiner* — Frantz Jean (57) ABSTRACT

Producing high quality depth maps. A time of flight camera and stereo cameras of a stereo camera arrangement are mapped into a common coordinate system. A correspondence between an RGB image taken from the time of flight camera and an RGB image taken from a reference stereo camera of the stereo camera arrangement is established. Intensity values of the plurality of pixels of a stereo camera left of the reference stereo camera, a stereo camera right of the reference stereo camera and the reference stereo camera are determined. These intensity values of the stereo camera left of the reference stereo camera and the stereo camera right of the reference stereo camera are compared to the reference camera. Based on the comparing, matching intensity values are determined.

20 Claims, 6 Drawing Sheets

Maps a time of flight camera and stereo cameras of a stereo camera arrangement into a common coordinate system.
405

Establishes a correspondence between an RGB image taken from the time of flight camera and an RGB image taken from the reference stereo camera of the stereo camera arrangement, wherein the RGB images taken from the time of flight camera and stereo cameras within the stereo camera arrangement comprise a plurality of pixels.
410

Determines intensity values of the plurality of pixels of a stereo camera left of the reference stereo camera, a stereo camera right of the reference stereo camera and the reference stereo camera.
415

Compares the intensity values of the stereo camera left of the reference stereo camera and the stereo camera right of the reference stereo camera as to the reference camera.
420

Finds a first plurality of differences between intensity values of pixels at the one or more depths of the reference stereo camera and intensity values of pixels at the one or more depths of the stereo camera that is positioned to the left of the reference stereo camera; and finds a second plurality of differences between locations of pixels at said one or more depths of said reference stereo camera and locations of pixels at said one or more depths of said stereo camera that is positioned to the right of said reference stereo camera.
425

Determines matching intensity values based on the comparing.
430

Generates a depth map based on the matching intensity values.
435

Modifies the intensity values of the depth map based on an up-sampled active brightness image and a depth image captured by a time of flight sensor of said time of flight camera; and generates a first redefined depth map based on the modifying.
440

Generates a second redefined depth map by applying a stereo confidence map to the first redefined depth map.
445

PRODUCING HIGH QUALITY DEPTH MAPS

FIELD

The field of the present invention relates to computing systems. More particularly, embodiments of the present invention relate to cameras.

BACKGROUND

Computers are widely used today to perform a variety of functions. For example, computers may be used within cameras to assist in producing higher quality images. Important technology in producing higher quality images is that of depth sensing. In "depth sensing", the distance between a point at a scene and a camera is determined using various techniques. By measuring the distance as such for many pixels, a depth map may be acquired.

One technique that used to sense depth is a time of flight sensor. A time of flight sensor sends out light and measures the time it takes for the light to travel from the camera, in one example, to the scene, and then back to the camera. By measuring this round-trip travel time, the distance from the point at the scene to the camera may be measured in real time. Many measurements may be taken for many pixels, thus generating a depth map. However, there exist many limitations to the conventional depth sensing technology.

BRIEF DESCRIPTION OF THE DRAWINGS

The accompanying drawings, which are incorporated in and form a part of this specification, illustrate embodiments of the present technology for producing high quality depth maps, together with the description, serve to explain principles discussed below:

FIG. 4A is a flowchart 400 of an example method for producing high quality depth maps, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "mapping", "establishing", "determining", "comparing", "computing", "finding", "generating", "removing", "modifying", denoising", "selecting", "matching", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers. It should be appreciated that in one embodiment, the present technology may be hardware and firmware, while in another embodiment, the present technology may be hardware and software.

Overview

The three dimensional reconstruction of images by multiple cameras is a well-studied problem. One of the key difficulties observed is the handling of portions of a three dimensional scene that has little or no surface texture. Active depth sensors are robust to low-textured scenes and capture three dimensional depths in real-time. Additionally, active depth sensors tend to reduce the amount of computation required. However, these active depth sensors typically have low resolutions (e.g., 160×120 vs. megapixel cameras that have much higher resolutions), and tend to be less accurate when the scene is heavily textured.

In contrast, conventional multi-camera (e.g., stereo matching) three dimensional reconstruction is unable to function reliably where there is little texture. Additionally, the amount of computation involved in using two or more cameras is necessarily very large.

As such, embodiments of the present technology provide a method for fusing active depth sensors with stereo matching to produce high quality depth maps in real time.

More particularly, embodiments of the present technology involve time of flight cameras and stereo cameras. Since these two types of cameras are well known in the art, only the following brief description is provided. A time of flight camera has a time of flight sensor. The time of flight sensor itself includes a red, green and blue (RGB) sensor and an infrared depth sensor. The time of flight sensor renders a depth image, an RGB image and an active brightness image. The depth image tends to be of a low resolution image, whereas the RGB image tends to be of a high resolution image. For example, the depth image may be 160 by 140, whereas the RGB image may be 1024 by 768. The active brightness image indicates the signal strength for the time of flight sensor. For example, the active brightness image indicates how much signal is being received back by the time of flight sensor.

The stereo camera is one of a group of stereo cameras within a stereo camera arrangement. For example, the stereo camera arrangement has a reference camera that is central to at least two other stereo cameras that are positioned to its left and to its right. Each stereo camera has a stereo sensor that renders an RGB image. (In one case, an RGB sensor of the time of flight sensor is the same as a stereo sensor [RGB stereo sensor] of a stereo camera within a stereo camera arrangement.) Thus, for each stereo sensor of each stereo camera, a separate RGB image is rendered.

More specifically and in brief, embodiments in accordance with the present technology map a time of flight camera (active depth sensor) and stereo cameras into a common coordinate system. A correspondence is then established between the RGB image taken from the time of flight camera and the RGB image taken from the reference stereo camera. Intensity values of the plurality of pixels comprising the stereo cameras are then determined. The intensity values associated with the stereo cameras left of and right of the reference stereo camera are compared with the intensity values of the reference stereo camera. Matching intensity values may then be determined based on this comparison. Next, a depth map is generated based on the determined matching intensity values. A first redefined depth map may be generated utilizing the up-sampled active brightness image and the depth image captured by the time of flight sensor. Further, a second redefined depth map may be generated utilizing a stereo confidence map applied to the first redefined depth map.

Thus, embodiments of the present technology enable higher quality, "redefined" depth maps in real time. The process requires less computation and renders more accurate results than conventional depth sensing solutions.

Example Architecture of a System for Producing High Quality Depth Maps

Figure 1:
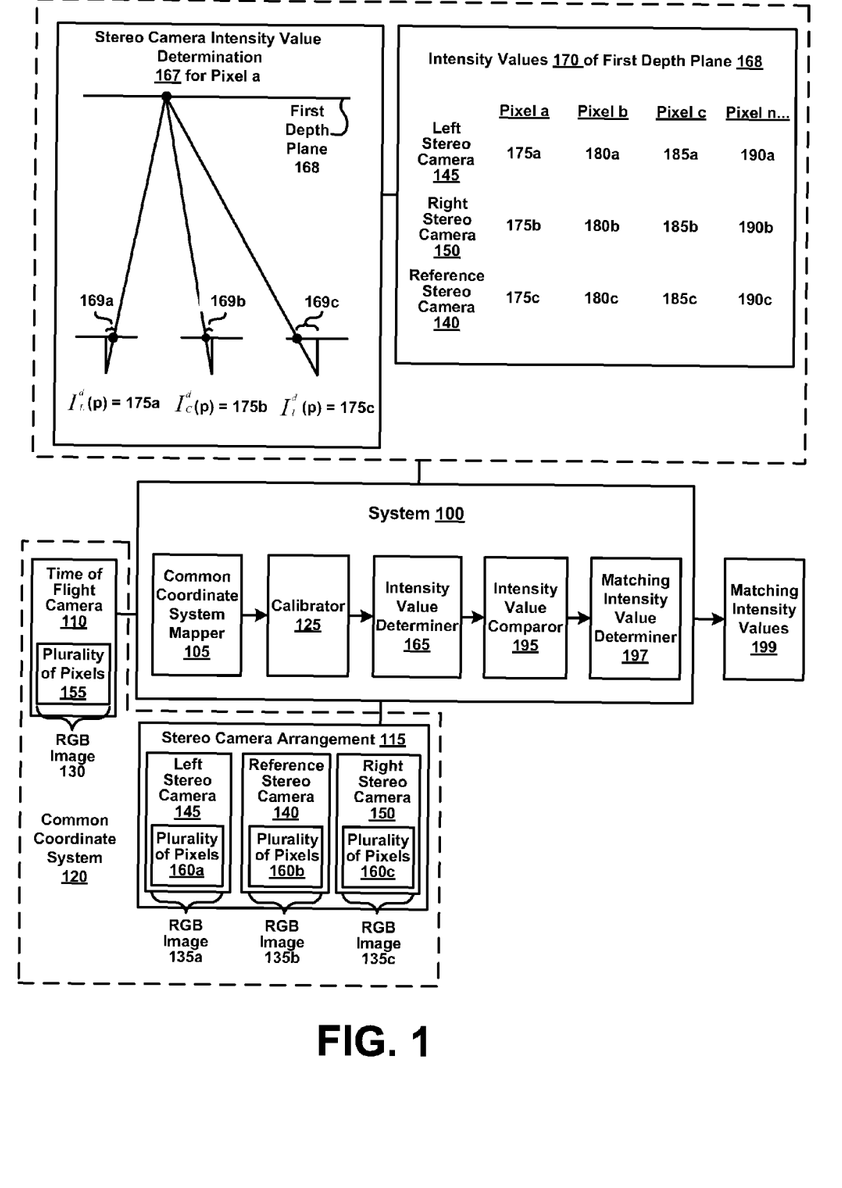
FIG. 1 is a block diagram of an example system 100, in accordance with embodiments of the present technology.

FIG. 1 is a block diagram of an example of a system 100 upon which embodiments of the present technology can be implemented. The system 100 of FIG. 1 and each of its elements may include elements other than those shown or described herein.

In one embodiment, system 100 includes a common coordinate system mapper 105, a calibrator 125, an intensity value determiner 165, an intensity value comparor 195 and a matching intensity value determiner 197.

Additionally, FIG. 1 shows system 100 communicating with time of flight camera 110 and stereo camera arrangement 115 that includes reference stereo camera 140, left stereo camera 145 and right stereo camera 150. Additionally, left stereo camera 145, reference stereo camera 140 and right stereo camera 150 comprise RGB images 135a, 135b and 135c, respectively. Further, RGB images 135a, 135b and 135c comprising plurality of pixels 160a, 160b and 160c respectively. Similarly, the time of flight camera 110 comprises an RGB image 130, which in turn comprises plurality of pixels 155. It should be appreciated that system 100 of FIG. 1 shows stereo camera arrangement 115 including only three stereo cameras 140, 145 and 150 for purposes of clarity and brevity in explanation. However, stereo camera arrangement 115 may include any number of stereo cameras that is more than one stereo camera that enables the implementation of embodiments of the present technology. For example, a time of flight camera 110 may include a time of flight sensor 302 with three RGB sensors and an infrared depth sensor. In another case, the time of flight camera 110 may include a time of flight sensor 302 with four RGB sensors and an infrared depth sensor. One of the RGB sensors of the time of flight sensor 302 may be the same as one of the RGB sensors of a stereo camera of the stereo camera arrangement 115.

It should also be understood that the time of flight camera 110 and the stereo cameras 140, 145 and 150 comprise at least, but are not limited to, the conventional components as have already been described herein.

FIG. 1 further shows a common coordinate system 120 encompassing time of flight camera 110 and stereo camera arrangement 115. A stereo camera intensity value determination 167 for pixel "a" is shown. $I^d_L(p)$ represents the intensity value for a pixel "p" associated with the left stereo camera 145 at a first depth plane 168. $I^d_C(p)$ represents the intensity value for the pixel "p" associated with the reference camera 140 at the first depth plane 168. Similarly, $I^d_R(p)$ represents the intensity value for the pixel "p" associated with the right stereo camera 150 at the first depth plane 168. The reference numbers 169a, 169b and 169c represent the measurement of the intensity values as given by $I^d_L(p)$, $I_C(p)$ and $I^d_R(p)$. In this instance, "p" represents pixel "a".

Furthermore, FIG. 1 also shows system 100 generating intensity values 170 at first depth plane 168 at pixels "a", "b", "c" and "n . . . " Intensity values that are generated for pixel "a" are 175a, 175b and 175c associated with left stereo camera 145, right stereo camera 150 and reference stereo camera 140, respectively. Intensity values that are generated for pixel "b" are 180a, 180b and 180c associated with left stereo camera 145, right stereo camera 150 and reference stereo camera 140, respectively. Intensity values that are generated for pixel "c" are 185a, 185b and 185c associated with left stereo camera 145, right stereo camera 150 and reference stereo camera 140, respectively. Intensity values that are generated for pixel "n . . . " are 190a, 190b and 190c associated with left stereo camera 145, right stereo camera 150 and reference stereo camera 140, respectively. It should be appreciated that the intensity values for as many pixels of an RGB image at as many depth planes may be determined for which a computational budget allows.

FIG. 1 also shows system 100 generating matching intensity values 199. Generating matching intensity values 199 will be described herein in the Operation section below.

Figure 2:
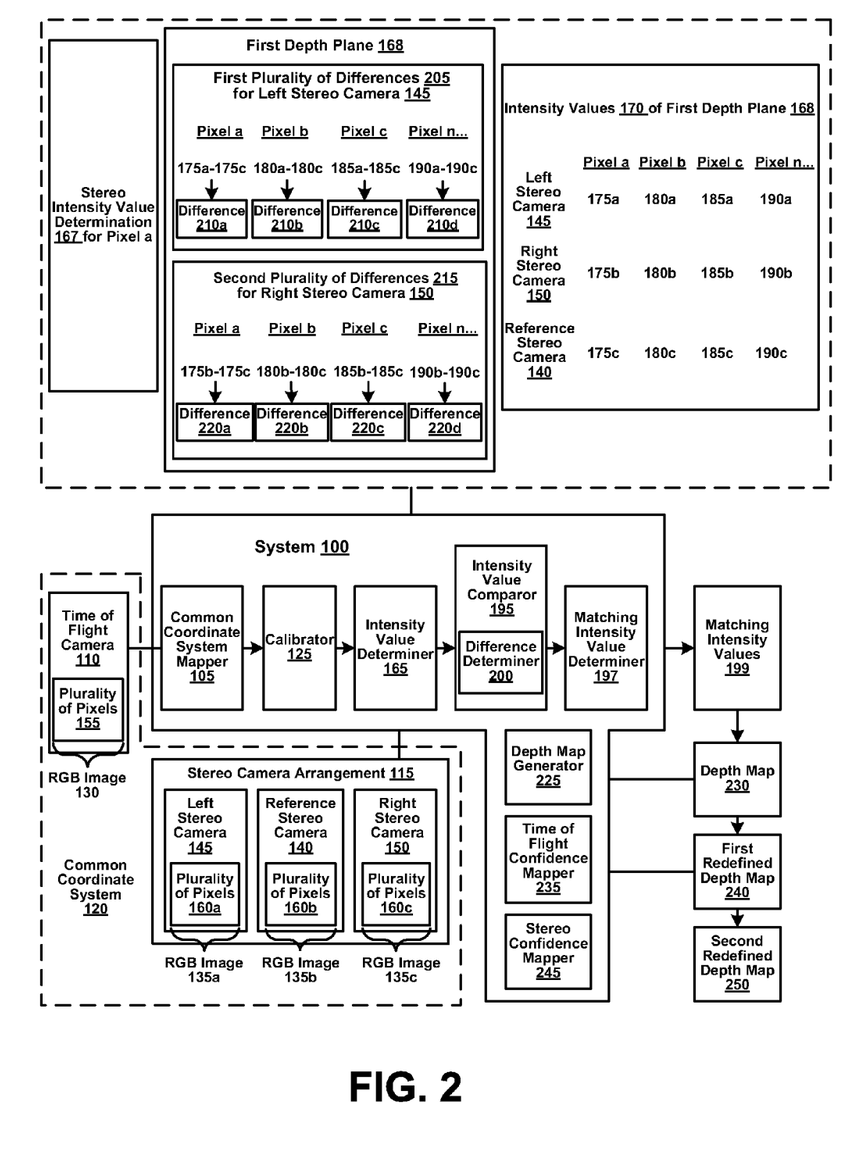
FIG. 2 is a block diagram of an example system 100, in accordance with embodiments of the present technology.

Referring now to FIG. 2, an example system 100 is shown in accordance with embodiments of the present technology. FIG. 2 shows system 100 further including one or more of the following: difference determiner 200; depth map generator 225; time of flight sensor confidence mapper 235; and stereo confidence mapper 245. FIG. 2 shows system 100 generating one or more of the following: depth map 230; first redefined depth map 240; and second redefined depth map 250. System 100 is also shown coupled with depth map 230 and first redefined depth map 240.

Further, FIG. 2 shows first plurality of differences 205 for the left stereo camera 145, including differences 210a, 210b, 210c and 210n . . . associated with pixel "a", "b", "c" and "n . . . ", respectively. Also shown is second plurality of differences 215 for the right stereo camera 150, including differences 220a, 220b, 220c and 220n . . . associated with pixel "a", "b", "c" and "n . . . ", respectively.

Figure 3:
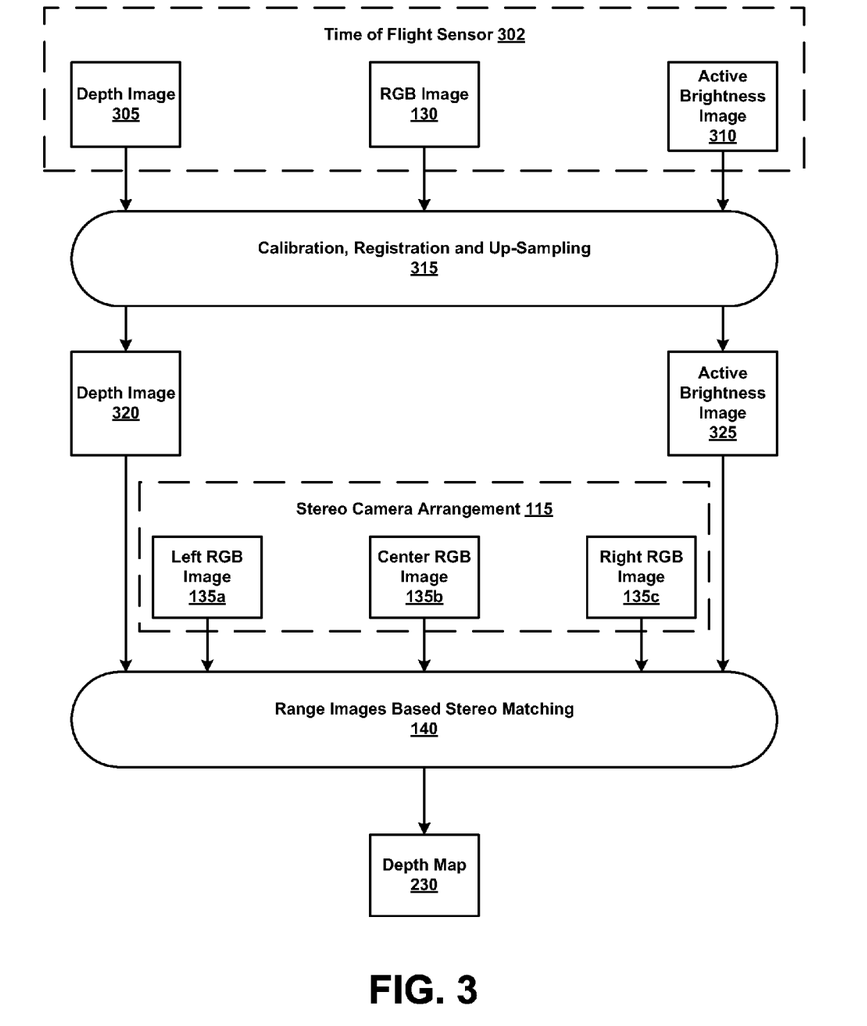
FIG. 3 is a block diagram of an overview of an example system 100 in operation, in accordance with embodiments of the present technology.

Referring now to FIG. 3, an overview of an example system 100 in operation is shown, in accordance with embodiments of the present technology. With attention focused on the architecture shown in FIG. 3, along with some overlap of the architecture shown in FIGS. 1 and 2, FIG. 3 shows a time of flight sensor 302 that includes depth image 305, RGB image 130 and active brightness image 310. Calibration, registration and up-Sampling 315 is performed on the time of flight sensor 302 according to techniques well known in the art and referred to herein. A higher resolution depth image 320 and active brightness image 325 results from the calibration, registration and upsampling 315 process.

FIG. 3 also shows stereo camera arrangement 115 including left RGB image 135a (having plurality of pixels 160a of left stereo camera 145—see FIGS. 1 and 2), center RGB image 135b (having plurality of pixels 160b of reference stereo camera 140—see FIGS. 1 and 2) and right RGB image 135c (having plurality of pixels 160c of reference stereo camera 150—See FIGS. 1 and 2). Of significance, embodiments of system 100 are designed to operate as part of the range images based stereo matching process 140. A depth map 230 is generated from the range images based stereo matching process. The following discussion regarding the operation of system 100 for producing high quality depth maps may be tracked through the components and processes outlined in FIG. 3.

Example Operation of a System for Producing High Quality Depth Maps

More generally, in embodiments in accordance with the present technology, system 100 is utilized to produce progressively higher quality depth maps while integrating the computation of a time of confidence depth map and/or a stereo confidence map.

In reference now to the time of flight sensor, in one embodiment of the present technology, up-sampling and bilateral filtering is performed on depth image, the RGB image and the active brightness image. Techniques for performing this up-sampling and bilateral filtering are described in U.S. patent application Ser. No. 12/540,211 by Kar Han Tan and Qingxiong Yang, as well as in U.S. patent application Ser. No. 12/415,962 by Kar Han Tan and Qingxiong Yang. This bilateral filtering and up-sampling process renders a higher resolution depth image and a higher resolution active brightness image. For example, the higher resolution depth image may have a resolution of 640×480 compared to the resolution of 160×120 of the original depth image. The active brightness image may have a resolution of 640×480 compared to the resolution of 160×120 of the original active brightness image.

Furthermore, since the IR depth sensor of the time of flight sensor and the RGB sensor of the time of flight sensor are physically located at separate positions on the time of flight sensor, they do not capture images from the same point. Therefore, a disparity exists between the two captured images. Thus, embodiments of the present technology use calibration and registration techniques known in the art to establish correspondence between the IR depth sensor and the RGB sensor of the time of flight sensor. Once performed, these calibration and registration techniques reduce the disparity found between the IR depth sensor and the RGB sensor.

In general, for each camera, there are intrinsic parameters (e.g., lens focal length and principle point) and distortion coefficients. In one embodiment, the parameters for the distortion are first determined. Then, the distortion is removed. At the same time as the distortion parameters are determined and the distortions are removed, the estimated intrinsic and extrinsic parameters are computed. Once these parameters are determined, the correspondence between the cameras may be established. Of note, determining estimated intrinsic and extrinsic camera parameters as well as performing distortion removal techniques are well known in the art.

An intrinsic matrix, as shown below, may be constructed for each individual camera. The matrix for each individual camera represents a pinhole camera model. A representation of the estimated intrinsic parameters of the individual cameras may be as follows (Equation 1):

$$K = \begin{bmatrix} f/p_x & s & c_x \\ 0 & f/p_y & c_y \\ 0 & 0 & 1 \end{bmatrix}$$

"K" represents the calibration matrix as it is applied to the time of flight RGB image, the RGB image to the left of the reference stereo camera, the RGB image to the right of the reference stereo camera, and the RGB image of the reference stereo camera itself. $p_x$ and $p_y$ represent pixel width in image coordinates in the x and y directions. $f/p_x$ and $f/p_y$ represent the focal length of the camera in terms of pixel dimensions in the x and y direction, respectively.

The estimated extrinsic parameters are also determined for each camera. A representation of the estimated extrinsic parameters that may be applied for each sensor of each camera is shown as follows (Equation 2):

$$P = R[I|t]$$

"P" represents the projection matrix as it is applied to the time of flight RGB image, the RGB image to the left of the reference stereo camera, the RGB image to the right of the reference stereo camera, and the RGB image of the reference stereo camera itself.

Once these intrinsic and extrinsic parameters are determined, then a process commonly known in the art as "rectification" is performed. In brief, this process refers to minimizing the amount of computational work that is done by only searching in corresponding lines. A common method to enable searching in corresponding lines is to map all the cameras into the same coordinate system.

It should be noted that the up-sampling, bilateral filtering, calibration and registration to establish correspondence between the IR depth sensor and the RGB sensor of the time of flight sensor and determining intrinsic and extrinsic parameters described herein may be performed by embodiments of the present technology or be the results of which that are performed by another system and that may be accessed by embodiments of the present technology. FIGS. 1 and 2 illustrate some embodiments of the present technology.

In general, the elements of FIGS. 1 and 2 are described according to the functions they perform. However, elements may perform functions in addition to those described herein. Also, functions described as being performed by multiple elements may instead be performed by a single element. Similarly, multiple functions described as being performed by a single (e.g., multifunctional) element may instead be divided in some way amongst a number of individual elements.

More particularly, and referring still to FIG. 1, in one embodiment, the time of flight camera and the stereo cameras are mapped into a common coordinate system. For example, a common coordinate system mapper 105 maps a time of flight camera 110 and stereo cameras 140, 145 and 150 of stereo camera arrangement 115 into a common coordinate system 120 through utilizing the pre-computed extrinsic matrices described herein. By mapping the time of flight camera 110 and the stereo cameras 140, 145 and 150 into the common coordinate system 120, the sensors within each of the time of flight camera 110 and the stereo cameras 140, 145 and 150 are also mapped into the common coordinate system 120.

Using the determined and/or accessed intrinsic and the extrinsic matrices and radial distortion coefficients enable embodiments of the present technology to calibrate the RGB sensor of the time of flight sensor with the RGB sensor of the stereo sensor. In other words, embodiments of the present technology establish a correspondence ("calibration") between the RGB sensor of the time of flight sensor comprising the time of flight camera 110 and the RGB sensor of the stereo sensor of the reference stereo camera 140 within the stereo camera arrangement 115. In essence, the RGB sensor of the time of flight sensor and the RGB sensor of the stereo sensor of the reference stereo camera become registered with each other.

Establishing a correspondence is performed by projecting as three-dimensional points the pixel points of the depth image of the time of flight sensor that was up-sampled. These three dimensional points are then captured back by the reference stereo camera. In other words, since the RGB sensor of the time of flight sensor and the RGB sensor of the stereo camera sensor of the reference stereo camera have already been registered and calibrated via the mapping described herein, then it is known what point on the reference stereo camera's RGB image to which the time of flight sensor's projected pixel point corresponds. In one embodiment, the following equation (Equation 3) may be used to establish correspondence between the one or more pixels of the RGB sensor of the time of flight sensor and the RGB sensor of the stereo sensor:

$$P_0 = [I \mid 0]$$
$$X' = (K_0^{-1} X), \quad X = [x, y, 1]^T$$
$$\bar{n} = \frac{X'}{\|X'\|} = [n_x, n_y n_z]^T$$
$$Q = D(X) \cdot \begin{bmatrix} \bar{n} \\ 1 \end{bmatrix} = [Q_x, Q_y, Q_z, D(X)]^T$$
$$Y' = P_C Q = R[I \mid \bar{t}] Q$$
$$Y = K_C Y'$$

"$P_0$" represents the projection matrix of the time of flight sensor. "$K_0$" represents the intrinsic matrix for the time of flight sensor. "X" represents a pixel in the RGB sensor of the time of flight sensor. "Y" represents the corresponding pixel in the stereo sensor. "Q" represents the location in three-dimensional space of the point that is being projected. "$P_c$" represents the extrinsic matrix of the stereo sensor (assuming that the RGB sensor of the time of flight sensor is a canonical camera). "$K_c$" represents the intrinsic matrix for the stereo sensor.

In one embodiment, artifacts of radial distortion are removed from the camera's images. For example, world lines may not be imaged as lines.

After rectification (e.g. mapping) and calibration (establishing correspondence) are performed, then the depth space for each stereo camera of the stereo camera arrangement is searched to determine matching intensity values, or the best match, between pixels of the stereo camera to the left of the reference stereo camera and the stereo camera to the right of the reference stereo camera and the reference stereo camera itself. Determining the matching intensity values involves determining intensity values for stereo cameras 140, 145 and 150, comparing the determined intensity values and then determining the matching intensity values 199.

More particularly and with reference to FIGS. 1 and 2, in one embodiment, intensity values 175a, 180a, 185a and 190a of a plurality of pixels "a", "b", "c" and "n . . . ", respectively, of the left stereo camera 145 are determined. Intensity values 175b, 180b, 185b and 190b of the plurality of pixels "a", "b", "c" and "n . . . ", respectively, of the right stereo camera 150 are also determined. Further, intensity values 175c, 180c, 185c and 190c of the plurality of pixels "a", "b", "c" and "n . . . ", respectively, of the reference stereo camera 140 are determined.

For example, and taking the centrally positioned stereo camera of the three stereo cameras 140, 145 and 150 as the reference stereo camera 140, a depth plane 168 ("depth space") that is perpendicular to the axis of the reference stereo camera 140 is examined. A certain depth corresponds to a certain amount of disparity.

In general, each pixel "p" of the reference stereo camera 140 is projected onto the stereo cameras to the left of and to the right of the reference stereo camera. Pixel points of the left stereo camera 145 (the RGB image 135a) and the right stereo camera 150 (the RGB image 135c) that correspond to the pixel points of the reference stereo camera 140 (RGB image 135b) are determined. Then, the intensity values are retrieved from the left and the right stereo cameras 145 and 150, respectively.

Next, in one embodiment, the intensity values of the stereo camera left of the reference stereo camera and the stereo camera right of the reference stereo camera are compared with the intensity values of the reference camera. More particularly, in one embodiment, the intensity values of the left stereo camera 145 and the right stereo camera 150 are compared with the intensity values of the reference stereo camera 140.

In one embodiment, "comparing" refers to finding a first plurality of differences between the intensity values of pixels at the one or more depths of the reference stereo camera and the intensity values of the pixels at the one or more depths of the stereo camera that is positioned to the left of the reference stereo camera. Furthermore, comparing further refers to finding a second plurality of differences between the locations of pixels at the one or more depths of the reference stereo camera and the locations of pixels at the one or more depths of the stereo camera that is positioned to the right of the reference stereo camera. More particularly and referring to FIG. 2, difference determiner 200 finds a first plurality of differences 205 between the intensity values of pixels "a", "b", "c" and "n . . . " at first depth plane 168 of the reference stereo camera 140 and the intensity values of the pixels "a", "b", "c" and "n . . . " at the first depth plane 168 of the left stereo camera 145. Difference determiner 200 also finds a second plurality of differences 215 between the intensity values of pixels "a", "b", "c" and "n . . . " at first depth plane 168 of the reference stereo camera 140 and the intensity values of the pixels "a", "b", "c" and "n . . . " at the first depth plane 168 of the right stereo camera 150.

Next, in one embodiment, a difference between the intensity values of the stereo camera positioned to the left of the reference stereo camera and the intensity values of the reference stereo camera for the corresponding pixel points is found. Also, a difference between the intensity values of the stereo camera positioned to the right of the reference stereo camera and the intensity values of the reference stereo camera for the corresponding pixel points is found. More particularly and still referring to FIG. 2, intensity value comparor 195 finds the differences 210a, 210b, 210c and 210n . . . between the intensity values of the left stereo camera 145 and the intensity values of the reference stereo camera 140 for corresponding pixel points "a", "b", "c" and "n . . . " Similarly, intensity value comparor 195 finds the differences 220a, 220b, 220c and 220n . . . between the intensity values of the right stereo camera 150 and the intensity values of the reference stereo camera 140 for corresponding pixel points "a", "b", "c" and "n . . . "

This process may be performed over a range of depths, according to a predetermined computational budget. The following is the equation (Equation 4) used to find the intensity values for the stereo cameras left of and right of the reference stereo camera, wherein the pixel locations of the stereo cameras left of and right of the reference stereo camera are compared to the pixel locations of the reference stereo camera:

$$M_L(p,d) = |I_L^d(p) - I_C(p)|$$

$$M_R(p,d) = |I_R^d(p) - I_C(p)|$$

"$M_L(p,d)$" and "$M_R(p,d)$" represent the absolute value of the differences found, "p" location at a certain depth "d" of the left "L" and right "R" camera, respectively, and a pixel location of the reference camera "C". "I" represents the intensity value.

These differences may then be compared to determine matching intensity values. For example and referring to FIG. 1, matching intensity value determiner 197 determines the matching intensity values of these differences based on the comparing performed by the intensity value comparor 195.

If little or no difference is calculated, then it may be determined that intensity values of the stereo camera left of and/or right of the reference stereo camera match. More particularly, in one example, take a pixel "p" that is projected onto a number of different depth planes, such as depth planes 1, 2, 3 and 4. For every depth plane 1, 2, 3 and 4, the pixel "p" is being projected onto a different point. For every particular depth plane, there is only one projection on the cameras to the left and to the right of the reference stereo camera. The intensity values for the pixel projected onto the cameras to the left of and to the right of the reference stereo camera are accessed and/or determined. The intensity values are then compared to the intensity values of the corresponding pixel on the reference stereo camera by finding the difference. The absolute difference is calculated using Equation 4 above. In one embodiment, the smallest difference over the range of depths, the "best match", is selected as the depth location of the pixel. In this manner, the depth location for all pixels may be determined. Thus, a depth map may be created using the "best match" for the range of depths.

Further, various techniques may be used to determine "the best match", depending on anticipated or realized occurrences and/or problems. For example, one problem with the pixels that are projected onto the stereo cameras to the left of and to the right of the reference stereo camera is that the resulting projection is "noisy", or not clear. Thus, techniques such as local and/or global optimization methods that are well known in the art may be applied to the matching cost (Equation 4). These local and/or global optimization methods include, but are not limited to, the following: box filter; joint bilateral filter; symmetric joint bilateral filter; loopy belief propagation; and graph cut.

In another embodiment, the smaller of the two intensity values for each accessed depth plane is selected as the "best match" (or "matching cost"). The equation for selecting the smaller of the two intensity values at each accessed depth plane is as follows (Equation 5):

$$M(p,d) = \min(M_L(p,d), M_R(p,d))$$

In one embodiment, after matching intensity values are found, a depth map is generated based on these matching intensity values. More particularly and referring to FIG. 2, in one embodiment, depth map generator 225 generates a depth map 230 based on the matching intensity values 199.

Once a depth map is generated, it is known that some parts of the depth map are going to be more reliable than other parts. For example, the parts of the depth map that correspond to non-textured areas of an image will not be confident (or will be noisy). A stereo confidence map may be computed by applying the following equation (Equation 6) to a generated depth map (Equation 7) and the matching cost (Equation 5):

$$C_S(p) = \left( \sum_{d \neq D(p)} \exp\left( -\frac{(M(p,d) - M(p,D(p)))^2}{\delta^2} \right) \right)^{-1}$$

Of note, the application of this Equation 6 will indicate what parts of the depth map may find use from the fusion of a time of flight sensor and its associated confidence map, as will be described below.

Further, in another embodiment, at every accessed depth plane, intensity values are determined for the stereo camera to the left of and to the right of the reference stereo camera. The smallest intensity value of the range of determined intensity values for the stereo camera to the left of the reference camera and the smallest intensity value of the range of determined intensity values for the stereo camera to the right of the reference stereo camera is selected. The equation that represents this process is as follows (Equation 7):

$$D(p) = \underset{d}{\operatorname{argmin}}(M(p,d))$$

This calculation results in an initial depth estimate for pixel "p" for the group of stereo cameras.

In one embodiment, a depth map is generated from the depth estimates for the pixels "p" for the stereo cameras. This depth map may be improved by fitting a polynomial function to the matching cost (Equation 4) to improve the quality of the depth map, as is well known in the art. Further, in one embodiment, a joint bilateral filter may also be applied to the generated depth map for denoising purposes.

Having acquired matching intensity values using any number of available techniques, some of which are described herein, the active brightness image may then be used to compute a time of flight confidence map for the time of flight sensor. In brief, when there is more light bouncing back to the camera, confidence is indicated. In contrast, when there is less light bouncing back to the camera, lack of confidence is indicated. The time of flight sensor confidence from the active brightness image (B) is defined as follows (Equation 7):

$$C_T(p) = \exp\left( -\frac{(\min(B, b_1) - b_2)^2}{\delta_B^2} \right)$$

where $b_1$, $b_2$, $\delta_B$ are constants.

Once the active brightness image is found, then sensor fusion is performed by modifying the intensity values based on the time of flight sensor confidence map. More particularly, time of flight sensor confidence mapper 235 modifies the intensity values of depth map 230 based on the up-sampled active brightness image 325 (of FIG. 3) and the depth image 320 (of FIG. 3) captured by a time of flight sensor of the time of flight camera and generates a first redefined depth map based on the modification of the intensity values. $M_L$ and $M_R$ are considered the intensity values. The smallest values of these intensity values is desired. Integrating the time of flight confidence map with stereo matching involves integrating the previously determined $M_L$ and $M_R$ with the time of flight confidence map. The integration equation is the following (Equation 8):

$$M_L^F(p,d)=|I_L^d(p)-I_C(p)|*(1-C_T(p))+C_T(p)*\min((d-D_T(p))^2\cdot\eta)$$

$$M_R^F(p,d)=|I_R^d(p)-I_C(p)|*(1-C_T(p))+C_T(p)*\min((d-D_T(p))^2\cdot\eta)$$

where $\eta$ is a constant

"F" represents fusing the time of flight confidence map with the determined intensity values. Equation 8, in essence, re-determines the depth based upon better information.

Furthermore, $M_L^F$ and $M_R^F$ may be further refined by applying a stereo confidence map $C_s$ to the above Equation 8 as follows (Equation 9):

$$W(p) = \frac{(1-C_S(p))*C_T(p)}{(1-C_T(p))*C_S(p)+(1-C_S(p))*C_T(p)}$$

$$M_L^F(p,d) = |I_L^d(p)-I_C(p)|*(1-W(p))+W(p)*\min((d-D_T(p))^2, \eta)$$

$$M_R^F(p,d) = |I_R^d(p)-I_C(p)|*(1-W(p))+W(p)*\min((d-D_T(p))^2, \eta)$$

$$W(p) = 0.5$$

when $$C_S(p) = C_T(p) = 0$$

W(p) is a way to combine two confidence measures. More particularly, in one embodiment, stereo confidence mapper 245 generates a second redefined depth map 250 by applying a stereo confidence map to the first redefined depth map 240, using Equation 9 above.

Figure 4B:
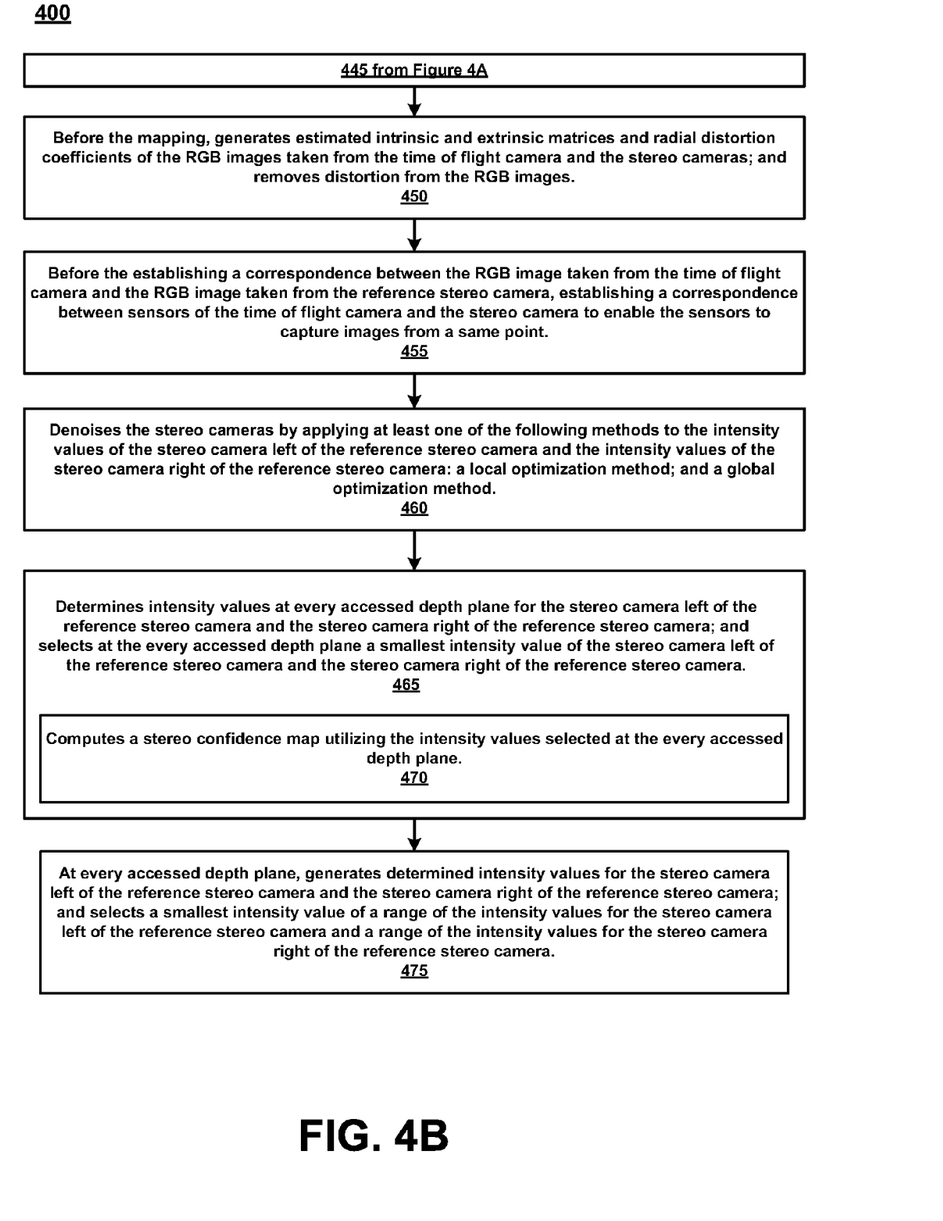
FIG. 4B is the flowchart 400 of FIG. 4A continued, the flowchart 400 being an example method for producing high quality depth maps, in accordance with embodiments of the present technology.

FIGS. 4A and 4B are flowcharts of an example method for producing high quality depth maps. Referring now to 405 of FIG. 4A and as described herein, in one embodiment, a time of flight camera and stereo cameras of a stereo camera arrangement are mapped into a common coordinate system. Referring now to 410 of FIG. 4A and as described herein, in one embodiment, a correspondence between an RGB image taken from a time of flight camera and an RGB image taken from a reference stereo camera of a stereo camera arrangement is established. The RGB images taken from the time of flight camera and stereo cameras within the stereo camera arrangement comprise a plurality of pixels.

Referring now to 415 of FIG. 4A, and as described herein, in one embodiment, intensity values of the plurality of pixels of a stereo camera left of a reference stereo camera, a stereo camera right of a reference stereo camera and a reference stereo camera are determined.

Referring now to 420 of FIG. 4A and as described herein, in one embodiment, the intensity values of a stereo camera left of a reference stereo camera and a stereo camera right of the reference stereo camera are compared with the intensity values of the reference camera. Furthermore, and referring to 425 of FIG. 4A and as described herein, in one embodiment, the comparing 420 comprises finding a first plurality of differences between intensity values of pixels at the one or more depths of a reference stereo camera and intensity values of pixels at the one or more depths of a stereo camera that is positioned to the left of said reference stereo camera. Comparing 420 further comprises finding a second plurality of differences between locations of pixels at the one or more depths of the reference stereo camera and locations of pixels at the one or more depths of a stereo camera that is positioned to the right of the reference stereo camera.

Referring now to 435 of FIG. 4A and as described herein, in one embodiment, a depth map is generated based on matching intensity values. Further, and referring to 440 of FIG. 4A and as described herein, in one embodiment, the intensity values of said depth map are modified based on an up-sampled active brightness image and a depth image captured by a time of flight sensor of the time of flight camera. A first redefined depth map is generated based on the modifying. Additionally, and referring to 445 of FIG. 4A and as described herein, in one embodiment, a second redefined depth map is generated by applying a stereo confidence map to the first redefined depth map.

Referring now to 450 of FIG. 4B and as described herein, in one embodiment, before the mapping 405, estimated intrinsic and extrinsic matrices and radial distortion coefficients of the RGB images taken from the time of flight camera and the stereo cameras are generated. The distortion is then removed from the RGB images. Referring now to 455 of FIG. 4B and as described herein, in one embodiment, before the establishing 410 of a correspondence between the RGB image taken from the time of flight camera and the RGB image taken from the reference stereo camera, a correspondence is established between sensors of the time of flight camera and the stereo camera to enable the sensors to capture images from a same point.

Referring now to 460 of FIG. 4B and as described herein, in one embodiment the stereo cameras are denoised by applying at least one of the following methods to the intensity values of the stereo camera left of the reference stereo camera and the stereo camera right of the reference stereo camera: a local optimization method; and a global optimization method. Referring now to 465 of FIG. 4B and as described herein, in one embodiment, the intensity values at every accessed depth plane for the stereo camera left of the reference stereo camera and the stereo camera right of the reference stereo camera is determined. Further, at every accessed depth plane a smallest intensity value of the stereo camera left of the reference stereo camera and the stereo camera right of the reference stereo camera is selected. Further, and referring to 470 of FIG. 4B and as described herein, in one embodiment a stereo confidence map utilizing the intensity values selected at every accessed depth plane is computed.

Referring now to 475 of FIG. 4B and as described herein, in one embodiment, at every accessed depth plane, intensity values for the stereo camera left of the reference stereo camera and the stereo camera right of the reference stereo camera are determined. Then, a smallest intensity value of a range of the intensity values for the stereo camera left of the reference stereo camera and a range of the intensity values for the stereo camera right of the reference stereo camera is selected.

Thus, embodiments of the present technology enable the fusion of active depth sensors and stereo image sensors to produce high quality, accurate depth maps in real time.

Example Computer System Environment

Figure 5:
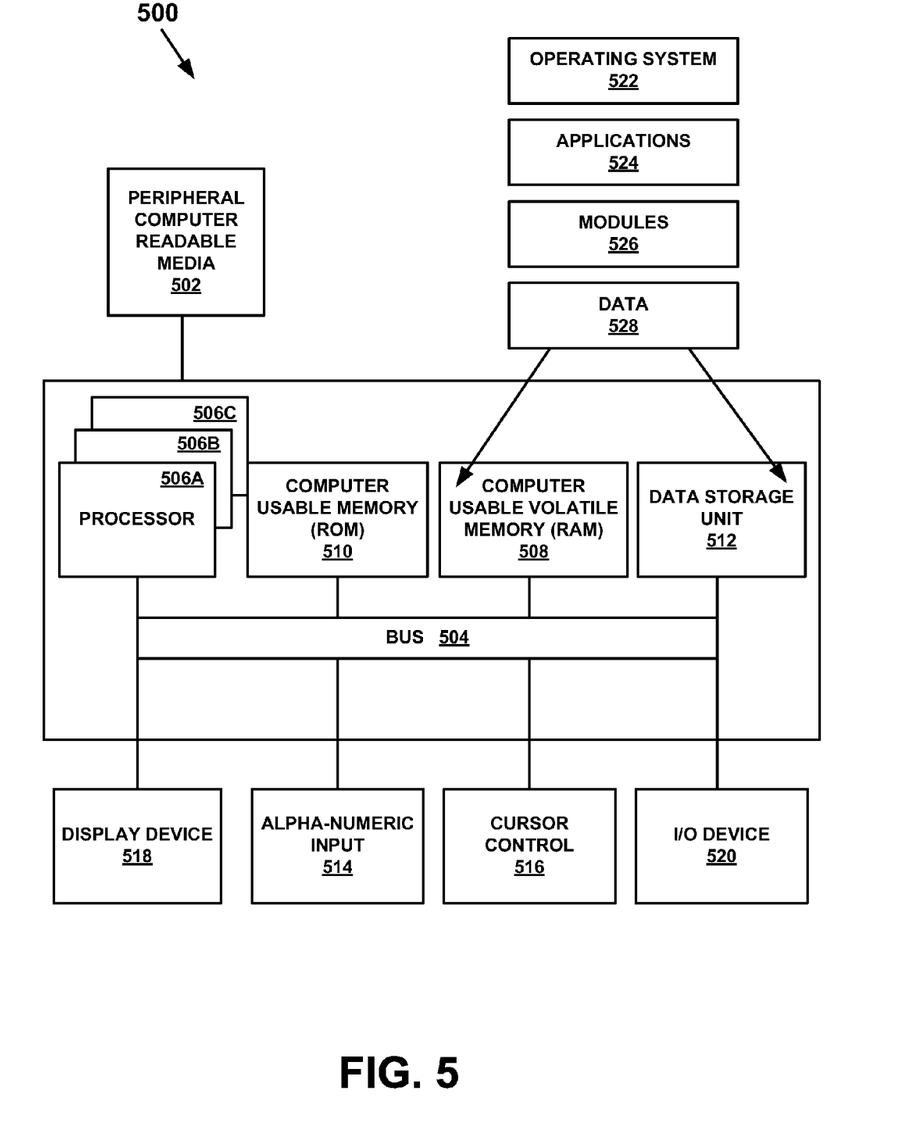
FIG. 5 is a diagram of an example computer system 500 enabling production of high quality depth maps, in accordance with embodiments of the present technology.

FIG. 5 illustrates an example computer system 500 used in accordance with embodiments of the present technology. It is appreciated that system 500 of FIG. 5 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 5, computer system 500 of FIG. 5 is well adapted to having peripheral computer readable media 502 such as, for example, a compact disc, and the like coupled therewith.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities.

Referring still to FIG. 5, various other components are depicted for system 500. Specifically, when present, an operating system 522, applications 524, modules 526, and data 528 are shown as typically residing in one or some combination of computer usable volatile memory 508, e.g., random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present invention, for example, is stored as an application 524 or module 526 in memory locations within RAM 508 and memory areas within data storage unit 512.

Computing system 500 is only one example of a suitable computing environment and is not intended to suggest any limitation as to the scope of use or functionality of embodiments of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for producing high quality depth maps in real time, said computer-implemented method comprising:

mapping a time of flight camera and stereo cameras of a stereo camera arrangement into a common coordinate system;

establishing a correspondence between a red, green and blue (RGB) image taken from said time of flight camera and an RGB image taken from a reference stereo camera of said stereo camera arrangement, wherein said RGB images taken from said time of flight camera and stereo cameras within said stereo camera arrangement comprise a plurality of pixels;

determining intensity values of said plurality of pixels of a stereo camera left of said reference stereo camera, a stereo camera right of said reference stereo camera and said reference stereo camera;

comparing said intensity values of said stereo camera left of said reference stereo camera and said stereo camera right of said reference stereo camera as to said reference camera; and determining matching intensity values based on said comparing.

2. The computer-implemented method of claim 1, wherein said comparing said intensity values of said stereo camera left of said reference stereo camera and said stereo camera right of said reference stereo camera as to said reference stereo camera comprises:

finding a first plurality of differences between intensity values of pixels at said one or more depths of said reference stereo camera and intensity values of pixels at said one or more depths of said stereo camera that is positioned to the left of said reference stereo camera; and finding a second plurality of differences between locations of pixels at said one or more depths of said reference stereo camera and locations of pixels at said one or more depths of said stereo camera that is positioned to the right of said reference stereo camera.

3. The computer-implemented method of claim 1, further comprising:

generating a depth map based on said matching intensity values.

4. The computer-implemented method of claim 3, further comprising:

modifying said intensity values of said depth map based on an up-sampled active brightness image and a depth image captured by a time of flight sensor of said time of flight camera; and generating a first redefined depth map based on said modifying.

5. The computer-implemented method of claim 4, further comprising:
generating a second redefined depth map by applying a stereo confidence map to said first redefined depth map.

6. The computer-implemented method of claim 1, further comprising:
before said mapping, generating estimated intrinsic and extrinsic matrices and radial distortion coefficients of said RGB images taken from said time of flight camera and said stereo cameras; and
removing distortion from said RGB images.

7. The computer-implemented method of claim 1, further comprising:
before said establishing a correspondence between said RGB image taken from said time of flight camera and said RGB image taken from said reference stereo camera, establishing a correspondence between sensors of said time of flight camera and said stereo camera to enable said sensors to capture images from a same point.

8. The computer-implemented method of claim 1, further comprising:
denoising said stereo cameras by applying at least one of the following methods to said intensity values of said stereo camera left of said reference stereo camera and said intensity values of said stereo camera right of said reference stereo camera; a local optimization method; and a global optimization method.

9. The computer-implemented method of claim 1, further comprising:
determining intensity values at every accessed depth plane for said stereo camera left of said reference stereo camera and said stereo camera right of said reference stereo camera; and
selecting at said every accessed depth plane a smallest intensity value of said stereo camera left of said reference stereo camera and said stereo camera right of said reference stereo camera.

10. The computer-implemented method of claim 9, further comprising:
computing a stereo confidence map utilizing said intensity values selected at said every accessed depth plane.

11. The computer-implemented method of claim 1, further comprising:
at every accessed depth plane, generating determined intensity values for said stereo camera left of said reference stereo camera and said stereo camera right of said reference stereo camera; and
selecting a smallest intensity value of a range of said intensity values for said stereo camera left of said reference stereo camera and a range of said intensity values for said stereo camera right of said reference stereo camera.

12. A computer system for producing high quality depth maps, said system comprising:
a common coordinate system mapper configured for mapping a time of flight camera and stereo cameras of a stereo camera arrangement into a common coordinate system;
a calibrator configured for establishing a correspondence between a red, green and blue (RGB) image taken from said time of flight camera and an RGB image taken from a reference stereo camera of said stereo camera arrangement, wherein said RGB images taken from said time of flight camera and stereo cameras within said stereo camera arrangement comprise a plurality of pixels;
an intensity value determiner configured for determining intensity values of said plurality of pixels of a stereo camera left of said reference stereo camera, a stereo camera right of said reference stereo camera and said reference stereo camera;
an intensity value comparor configured for comparing said intensity values of said stereo camera left of said reference stereo camera and said stereo camera right of said reference stereo camera as to said reference camera; and
a matching intensity value determiner configured for determining matching intensity values based on said comparing.

13. The computer system of claim 12, wherein said intensity value comparor comprises:
a difference determiner configured for finding a first plurality of differences between intensity values of pixels at said one or more depths of said reference stereo camera and intensity values of pixels at said one or more depths of said stereo camera that is positioned to the left of said reference stereo camera and finding a second plurality of differences between locations of pixels at said one or more depths of said reference stereo camera and locations of pixels at said one or more depths of said stereo camera that is positioned to the right of said reference stereo camera.

14. The computer system of claim 12, further comprising:
a depth map generator configured for generating a depth map based on said matching intensity values.

15. The computer system of claim 14, further comprising:
a time of flight sensor confidence mapper configured for modifying said intensity values of said depth map based on an up-sampled active brightness image and a depth image captured by a time of flight sensor of said time of flight camera and generating a first redefined depth map based on said modifying.

16. The computer system of claim 15, further comprising:
a stereo confidence mapper configured for generating a second redefined depth map by applying a stereo confidence map to said first redefined depth map.

17. A computer usable storage medium comprising instructions that when executed cause a computer system to perform a method for producing high quality depth maps, said method comprising:
mapping a time of flight camera and stereo cameras of a stereo camera arrangement into a common coordinate system;
establishing a correspondence between a red, green and blue (RGB) image taken from said time of flight camera and an RGB image taken from a reference stereo camera of said stereo camera arrangement, wherein said RGB images taken from said time of flight camera and said stereo cameras comprise a plurality of pixels;
matching intensity values of said plurality of pixels of a stereo camera left of said reference stereo camera and a stereo camera right of said reference stereo camera to said reference stereo camera to generate a depth map; and
computing a time of flight confidence depth map utilizing said matching intensity values and an up-sampled active brightness image and a depth image captured by a time of flight sensor of said time of flight camera, said time of flight confidence depth map modifying said depth map and generating a first redefined depth map.

18. The method of claim 17, further comprising:
modifying said intensity values of said first redefined depth map utilizing a stereo confidence map; and
generating a second redefined depth map based on said modifying.

19. The method of claim 17, further comprising:
determining intensity values at every accessed depth plane for said stereo camera left of said reference stereo camera and said stereo camera right of said reference stereo camera; and
selecting at said every accessed depth plane a smallest intensity value of said stereo camera left of said reference stereo camera and said stereo camera right of said reference stereo camera.

20. The method of claim 19, further comprising:
computing a stereo confidence map utilizing said intensity values selected at said every accessed depth plane.

* * * * *

UNITED STATES PATENT AND TRADEMARK OFFICE
CERTIFICATE OF CORRECTION

PATENT NO. : 8,355,565 B1
APPLICATION NO. : 12/608394
DATED : January 15, 2013
INVENTOR(S) : Qingxiong Yang et al.

Page 1 of 1

It is certified that error appears in the above-identified patent and that said Letters Patent is hereby corrected as shown below:

In column 14, line 56, in Claim 2, delete "thatis" and insert -- that is --, therefor.

In column 15, line 29, in Claim 8, delete "camera;" and insert -- camera: --, therefor.

Signed and Sealed this
Ninth Day of April, 2013

Teresa Stanek Rea
*Acting Director of the United States Patent and Trademark Office*